United States Patent
Takami et al.

(10) Patent No.: US 10,236,501 B2
(45) Date of Patent: Mar. 19, 2019

(54) ACTIVE MATERIAL, NONAQUEOUS ELECTROLYTE BATTERY, AND BATTERY PACK

(71) Applicant: KABUSHIKI KAISHA TOSHIBA, Minato-ku (JP)

(72) Inventors: Norio Takami, Yokohama (JP); Yasuhiro Harada, Yokohama (JP); Kazuki Ise, Fuchu (JP); Yorikazu Yoshida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 36 days.

(21) Appl. No.: 14/325,728

(22) Filed: Jul. 8, 2014

(65) Prior Publication Data

US 2015/0010820 A1    Jan. 8, 2015

(30) Foreign Application Priority Data

Jul. 8, 2013 (JP) ................................. 2013-142497

(51) Int. Cl.
| | |
|---|---|
| *H01M 4/36* | (2006.01) |
| *H01M 4/131* | (2010.01) |
| *H01M 4/62* | (2006.01) |
| *H01M 10/05* | (2010.01) |
| *H01M 10/052* | (2010.01) |

(Continued)

(52) U.S. Cl.
CPC .......... *H01M 4/366* (2013.01); *H01M 4/131* (2013.01); *H01M 4/625* (2013.01); *H01M 10/05* (2013.01); *H01M 10/052* (2013.01); *H01M 10/054* (2013.01); *H01M 10/0525* (2013.01); *H01M 2004/021* (2013.01); *Y02E 60/122* (2013.01)

(58) Field of Classification Search
CPC ....... H01M 4/366; H01M 4/131; H01M 4/625
See application file for complete search history.

(56) References Cited

U.S. PATENT DOCUMENTS 5,172,307 A * 12/1992 Tabuchi ................. H01G 9/155
29/25.03
5,244,757 A    9/1993 Takami et al.
(Continued)

FOREIGN PATENT DOCUMENTS

| CN | 102544466 A | 7/2012 |
|---|---|---|
| CN | 102694160 A | 9/2012 |

(Continued)

OTHER PUBLICATIONS

Translation of JP2001-143702.*

(Continued)

*Primary Examiner* — Sarah A. Slifka
*Assistant Examiner* — Brian R Ohara
(74) *Attorney, Agent, or Firm* — Oblon, McClelland, Maier & Neustadt, L.L.P.

(57) ABSTRACT

According to one embodiment, there is provided an active material including monoclinic niobium titanium composite oxide particles and a carbon material layer. The monoclinic niobium titanium composite oxide particles can absorb and release Li ions or Na ions and satisfy Formula (1) below. The carbon material layer covers at least a part of surfaces of the niobium titanium composite oxide particles and satisfies Formula (2) below:

$$0.5 \le (\alpha/\beta) \le 2 \qquad (1)$$

$$0 \le (\gamma/\sigma) \le 0.1 \qquad (2)$$

15 Claims, 2 Drawing Sheets

(51) Int. Cl.
*H01M 10/054* (2010.01)
*H01M 4/02* (2006.01)
*H01M 10/0525* (2010.01)

(56) References Cited

U.S. PATENT DOCUMENTS

| | | | | |
|---|---|---|---|---|
| 5,888,430 | A * | 3/1999 | Wakayama | H01B 1/18 252/503 |
| 7,309,543 | B2 * | 12/2007 | Shizuka | H01M 4/0404 429/128 |
| 8,647,773 | B2 * | 2/2014 | Goodenough | C01G 33/00 429/231.5 |
| 2007/0264574 | A1 | 11/2007 | Kim et al. | |
| 2011/0045328 | A1 * | 2/2011 | Inagaki | H01M 4/485 429/90 |
| 2011/0206991 | A1 * | 8/2011 | Nakahara | C01B 25/00 429/231.5 |
| 2011/0281168 | A1 * | 11/2011 | Watanabe | H01M 4/525 429/223 |
| 2012/0052401 | A1 * | 3/2012 | Goodenough | H01M 4/485 429/341 |
| 2012/0107692 | A1 * | 5/2012 | Harada | C01G 23/002 429/231.2 |
| 2012/0244442 | A1 | 9/2012 | Harada et al. | |
| 2013/0059203 | A1 * | 3/2013 | Hong | H01M 4/134 429/213 |

FOREIGN PATENT DOCUMENTS

| | | |
|---|---|---|
| CN | 103081187 A | 5/2013 |
| JP | 4-288361 A | 10/1992 |
| JP | 2001143702 A * | 5/2001 |
| JP | 2005-135872 A | 5/2005 |
| JP | 2007-305569 A | 11/2007 |
| JP | 2010-287496 A | 12/2010 |
| JP | 2012-099267 A | 5/2012 |
| JP | 2012-199146 A | 10/2012 |
| JP | 2012-221758 | 11/2012 |
| JP | 2013-535767 A | 9/2013 |
| WO | WO 2005/098998 A1 | 10/2005 |
| WO | 2012/016185 A2 | 2/2012 |

OTHER PUBLICATIONS

Combined Office Action and Search Report dated Feb. 1, 2016 in Chinese Patent Application No. 201410322915.4 with partial English translation and English translation of category of cited documents.

Office Action dated Oct. 19, 2015 in Korean Patent Application No. 10-2014-0085272 (with English language translation).

Jian-Tao Han, et al., "New Anode Framework for Rechargeable Lithium Batteries" Chemistry of Materials, 2011, pp. 2027-2029.

Office Action dated Apr. 20, 2016 in Korean Patent Application No. 10-2014-0085272 with English translation of the Office Action.

Office Action dated Aug. 12, 2016 in Chinese Patent Application No. 201410322915.4 (with English translaiton).

Japanese Office Action dated Jul. 11, 2017 in Japanese Patent Application No. 2014-139091.

Office Action dated Feb. 7, 2017 in Japanese Patent Application No. 2014-139091, filed Jul. 4, 2014.

Combined Chinese Office Action and Search Report dated Feb. 27, 2017 in Patent Application No. 201410322915.4 (with English language translation of categories of cited documents).

* cited by examiner

ACTIVE MATERIAL, NONAQUEOUS ELECTROLYTE BATTERY, AND BATTERY PACK

CROSS-REFERENCE TO RELATED APPLICATIONS

This application is based upon and claims the benefit of priority from prior Japanese Patent Application No. 2013-142497, filed Jul. 8, 2013, the entire contents of which are incorporated herein by reference.

FIELD

Embodiments described herein relate generally to an active material, a nonaqueous electrolyte battery, and a battery pack.

BACKGROUND

A nonaqueous electrolyte battery prepared by using a graphite material or a carbonaceous material which absorbs and releases lithium ions for a negative electrode is commercialized as a high-energy density battery for portable devices. In recent years, the practical use of a lithium metal oxide containing Ni such as $LiNi_aCo_bAl_{1-a-b}O_2$ or $LiNi_aCo_bMn_{1-a-b}O_2$ as a positive electrode active material, in place of $LiCoO_2$ or $LiMn_2O_4$, has been proceeded in order to improve the energy density of batteries.

On the other hand, in the case of mounting the battery in a vehicle such as an automobile or a train, the positive and negative electrodes are required to be formed of a material excellent in chemical and electrochemical stability, in mechanical strength and in corrosion resistance in view of storage performance in high-temperature environments, cycle performance, and reliability of high power over a long time. Further, the positive and negative electrodes are required to be formed of a material having high performance in cold climates, high-output performance in a low temperature environment (–40° C.), and long life performance. On the other hand, from the viewpoint of improvement in safety, a nonvolatile and noncombustible electrolyte solution has been developed as a nonaqueous electrolyte; however, it has not yet been put to practical use because it is accompanied by a decrease in output performance, low-temperature performance, and long life performance.

As described above, in order to mount the lithium ion battery on a vehicle, the objective is to achieve high-temperature endurance, cycle life, safety, and output performance.

When a titanium-based oxide such as $TiO_2$ or $Li_4Ti_5O_{12}$ is used as a negative electrode instead of the graphite material or the carbonaceous material, the lifetime performance and safety of the battery are improved. However, the energy density is decreased. The decrease in the energy density of the battery is due to the fact that the negative electrode potential of the titanium-based oxide (vs. Li) is as high as about 1.5 V, the battery voltage decreases, and the capacity of the negative electrode is small. Therefore, in order to increase the capacity of the battery, it is necessary to use the titanium-based oxide having a high capacity and excellent in output performance and lifetime performance.

DETAILED DESCRIPTION

Figure 1:
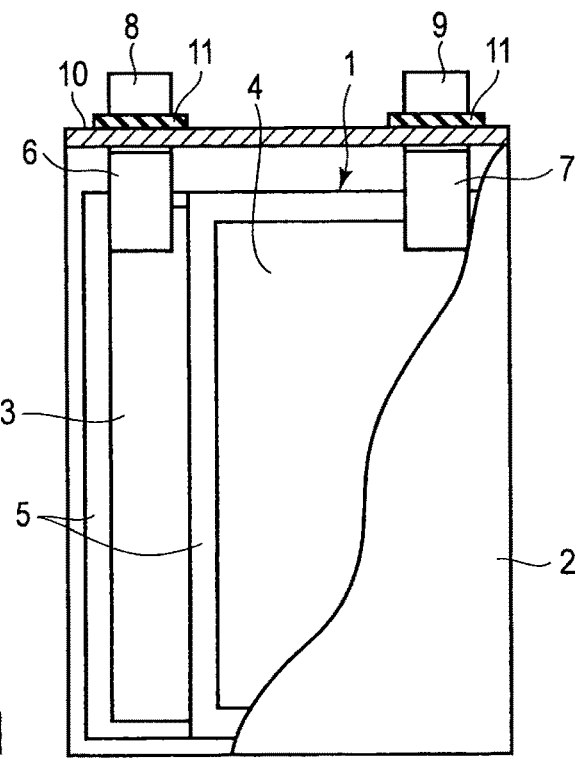
FIG. 1 is a partially notched cross-sectional view of a nonaqueous electrolyte battery of an embodiment.

According to one embodiment, there is provided an active material including monoclinic niobium titanium composite oxide particles and a carbon material layer. The monoclinic niobium titanium composite oxide particles can absorb and release Li ions or Na ions and satisfy Formula (1) below. The carbon material layer covers at least a part of surfaces of the niobium titanium composite oxide particles and satisfies Formula (2) below:

$$0.5 \leq (\alpha/\beta) \leq 2 \quad (1)$$

$$0 \leq (\gamma/\sigma) \leq 0.1 \quad (2)$$

wherein $\alpha$ represents a mole number of Nb of the niobium titanium composite oxide particles, $\beta$ represents a mole number of Ti of the niobium titanium composite oxide particles, $\gamma$ represents a number of hydrogen atoms in the carbon material layer, and $\sigma$ represents a number of carbon atoms in the carbon material layer.

According to the embodiments, there is provided a nonaqueous electrolyte battery including: a positive electrode; a negative electrode containing the active material of the embodiments; and a nonaqueous electrolyte.

According to the embodiments, there is provided a battery pack including a nonaqueous electrolyte battery according to the embodiments.

(First Embodiment)

According to a first embodiment, there is provided an active material including monoclinic niobium titanium composite oxide particles and a carbon material layer. The monoclinic niobium titanium composite oxide particles can absorb and release Li ions or Na ions and satisfy Formula (1) below. The carbon material layer covers at least a part of the surfaces of the niobium titanium composite oxide particles and satisfies Formula (2) below:

$$0.5 \leq (\alpha/\beta) \leq 2 \quad (1)$$

$$0 \leq (\gamma/\sigma) \leq 0.1 \quad (2)$$

wherein $\alpha$ represents the mole number of Nb of the niobium titanium composite oxide particles, $\beta$ represents the mole number of Ti of the niobium titanium composite oxide particles, $\gamma$ represents the number of hydrogen atoms in the carbon material layer, and $\sigma$ represents the number of carbon atoms in the carbon material layer.

A higher ratio ($\alpha/\beta$) of the mole number of Nb to the mole number of Ti in the monoclinic niobium titanium composite oxide particles means that the capacity of the active material can be improved, but the electron conductivity of the niobium titanium composite oxide is reduced. In order to improve the electron conductivity of the active material, the surfaces of the niobium titanium composite oxide particles may be covered with a carbon material. However, a higher mole ratio ($\alpha/\beta$) means that the carbon material (C) more easily causes the reduction reaction of Nb. Thus, the electron conductivity of the active material cannot be improved by covering the active material with a carbon material layer. Accordingly, in fact, it has been difficult in practice to improve the capacity and electron conductivity of an active material prepared by using monoclinic niobium titanium composite oxide particles.

The present inventors have specified the relationship between the ratio ($\alpha/\beta$) of the mole number of Nb to the mole number of Ti and the ratio ($\gamma/\sigma$) of the number of hydrogen atoms to the number of carbon atoms in the carbon material and thus they have succeeded in improving the capacity and electron conductivity of the active material prepared by using monoclinic niobium titanium composite oxide particles. In order to improve the large current discharge performance, the ratio ($\alpha/\beta$) is desirably $0.8 \leq (\alpha/\beta) \leq 1.9$. The ratio in the range yields a niobium titanium composite oxide containing a titanium oxide phase (e.g., rutile $TiO_2$ and TiO) in addition to monoclinic $Li_xTiNb_2O_7$ and $Na_xTiNb_2O_7$. Thus, the electron conductivity of the composite oxide is improved and the large current discharge performance is excellent. This is considered to be due to the fact that lithium ions are absorbed in $TiO_2$ of the titanium oxide phase after charging the battery, and the generated $Li_xTiO_2$ remains in the niobium titanium composite oxide particles, resulting in an increase in the electron conductivity. Further, a mixture of niobium titanium composite oxide particles and titanium oxide particles may be used as the active material. Examples of the titanium oxide include $Li_4Ti_5O_{12}$ having a spinel structure and $TiO_2$ (B).

The monoclinic niobium titanium composite oxide is desirably represented by $A_xTiM_yNb_{2-y}O_{7\pm z}$ ($0 \leq x \leq 5$, $0 \leq y \leq 0.5$, $-0.3 \leq z \leq 0.3$; M represents at least one kind of metal other than Ti and Nb, and A represents Li or Na). Examples of the monoclinic niobium titanium composite oxide represented by $A_xTiM_yNb_{2-y}O_{7\pm z}$ include $TiNb_2O_7$, $Li_xTiNb_2O_7$ capable of absorbing and releasing Li ions ($0 \leq x \leq 5$), and $Na_xTiNb_2O_7$ capable of absorbing and releasing Na ions ($0 \leq x \leq 5$).

z varies depending on the reducing conditions of the monoclinic niobium titanium composite oxide. In the oxide in which z exceeds $-0.3$, niobium is reduced previously, the electrode performance is reduced, and phase separation may occur. On the other hand, the measurement error range is up to $z=+0.3$.

Examples of M in the niobium titanium composite oxide include one or more kinds of transition metals other than Nb and Ti. More preferably, M is at least one kind selected from the group consisting of Mg, Al, V, Fe, Mo, Sn, and W. The crystallinity of the niobium titanium composite oxide is increased by substituting a part of the Nb site with at least one or more elements selected from the group consisting of Mg, Al, V, Fe, Mo, Sn, and W, resulting in an increase in electrode capacity. An abundance ratio y is from 0 to 0.5. If the ratio exceeds this range, it exceeds the solubility limit and the phase separation occurs. Thus, the electrode capacity may be reduced. A more preferable range is $0.05 \leq y \leq 0.2$.

When a ratio ($\gamma/\sigma$) of the number of hydrogen atoms to the number of carbon atoms of the carbon material layer is set to $0 \leq (\gamma/\sigma) \leq 0.1$, the reductive decomposition of the nonaqueous electrolyte can be suppressed while improving the electron conductivity of the electrode, and the cycle life performance can be improved. If the atomic ratio ($\gamma/\sigma$) exceeds 0.1, the electron conductivity of the electrode is decreased. Thus, the cycle life performance is reduced. A more preferable atomic ratio ($\gamma/\sigma$) is $0 \leq (\gamma/\sigma) \leq 0.05$.

In order to set the atomic ratio ($\gamma/\sigma$) to the range of $0 \leq (\gamma/\sigma) \leq 0.1$, it is necessary to add a carbon material precursor to the niobium titanium composite oxide particles in which the mole ratio ($\alpha/\beta$) satisfies $0.5 \leq (\alpha/\beta) \leq 2$ and uniformly mixing them, or to vapor-deposit the carbon material precursor on the niobium titanium composite oxide particles and perform heat treatment at 600° C. or more in an inert atmosphere. If the heat treatment temperature is less than 600° C., the electron conductivity of the active material is low, and the cycle life performance is reduced. On the other hand, if at least a part of the surfaces of niobium titanium composite oxide particles in which the mole ratio ($\alpha/\beta$) is larger than 2 is covered with a carbon material precursor, and then the resulting product is subjected to a heat treatment at 600° C. or more, the surface layer of the niobium titanium composite oxide particles is reduced by the carbon material, and the oxygen deficiency is increased. Thus, the electrode capacity and the cycle life performance are significantly reduced. Therefore, it is preferable that a carbon precursor is attached to the niobium titanium composite oxide particles in which the mole ratio ($\alpha/\beta$) satisfies $0.5 \leq (\alpha/\beta) \leq 2$ and the resulting product is subjected to a heat treatment at 600 to 1000° C. in an inert atmosphere.

The average primary particle diameter of the niobium titanium composite oxide particles is 1 µm or less, preferably 0.5 µm or less. When the diameter is adjusted to this grain size, the resistance associated with the diffusion of Li ions or Na ions in the particles is reduced. Thus, the large current discharge performance and the rapid charge performance are significantly improved. The lower limit of the average primary particle diameter is desirably set to 0.05 µm. High crystallinity is obtained by setting the average primary particle diameter to 0.05 µm or more. Thus, a high capacity can be obtained.

The active material of the embodiments can be produced, for example, in the following manner. First, starting materials are mixed. As the starting materials of the niobium titanium composite oxide, oxides containing Li or Na, Ti, and Nb or salts containing Li or Na, Ti, and Nb are used. As the starting materials for other additional elements in the niobium titanium composite oxide, oxides containing at least one element selected from the group consisting of Mg, Al, V, Fe, Mo, Sn, and W or salts containing at least one element selected from the group consisting of Mg, Al, V, Fe, Mo, Sn, and W are used. The salts used as the starting materials are preferably salts which decompose at relatively low melting points to form oxides, like hydroxide salt, carbonate, and nitrate. In order to make the primary particle diameter smaller, it is preferable to use powder having an average particle size of 1 µm or less, preferably 0.5 µm or less as the starting materials.

The starting materials are mixed so that the mole ratio ($\alpha/\beta$) is $0.5 \leq (\alpha/\beta) \leq 2$. Further, an element M as other additional elements (at least one element selected from the group consisting of Mg, Al, V, Fe, Mo, Sn, and W) is preferably added in such a mole ratio that the overall charge of the crystal in which a part of Nb is substituted by the element M is kept neutral. Thus, an active material containing the monoclinic niobium titanium composite oxide represented by $A_xTiM_yNb_{2-y}O_{7\pm z}$ ($0 \leq x \leq 5$, $0 \leq y \leq 0.5$, $-0.3 \leq z \leq 0.3$, M represents at least one kind of metal other than Ti and Nb, and A represents Li or Na) can be obtained. Even in a method of adding the element M in such a manner that the overall charge is not kept neutral, a crystal which maintains the crystal structure of $A_xTiM_yNb_{2-y}O_{7\pm z}$ in a large part thereof can be obtained by adjusting the amount of the element M.

Next, the obtained mixture is ground and blended as uniformly as possible. Then, the obtained mixture is sintered. The sintering is performed at a temperature range from 500 to 1200° C., preferably at a temperature range from 700 to 1000° C. When the sintering is performed at a sintering temperature of 1000° C. or less, conventional facilities can be used. This method allows for production of a powder containing a monoclinic niobium titanium composite oxide which is represented by $AxTiM_yNb_{2-y}O_{7\pm z}$ and has an average primary particle diameter of 1 µm or less. Further, the same powder containing a monoclinic niobium titanium composite oxide having an average primary particle diameter of 1 µm or less can be obtained using the hydrothermal synthesis method.

Further, a predetermined amount (weight ratio: 10% or less) of the carbon material precursor is added to the resulting oxide powder containing a monoclinic niobium titanium composite oxide. Ethanol is added thereto, and the mixture is uniformly mixed in a ball mill. Thereafter, the resulting mixture is subjected to a heat treatment at 600° C. to 1000° C. in an inert atmosphere (e.g., in a nitrogen or argon atmosphere) to obtain a niobium titanium composite oxide powder in which at least a part of the surface thereof is covered with the carbon material layer and in which the atomic ratio ($\gamma/\sigma$) is in the range of $0 \leq (\gamma/\sigma) \leq 0.1$. If the heat treatment temperature is lower than the above-described range, the atomic ratio ($\gamma/\sigma$) exceeds 0.1. Thus, the resistance is increased and the reactivity with the nonaqueous electrolyte is increased, resulting in a reduction in cycle life. If the heat treatment temperature exceeds the above-described range, the reaction in which the carbon material reduces the surface layer of the niobium oxidation compound oxide particles is facilitated, resulting in a decrease in electrode capacity.

The average secondary particle diameter of the niobium titanium composite oxide powder in which at least a part of the surface thereof is covered with the carbon material layer is preferably from 1 to 20 µm in order to increase the electrode density. The powder is preferably ground again in order to be adjusted to the above range. The amount of the carbon material layer is preferably from 0.1 to 5% by weight (wherein the total of the carbon material layer and the niobium titanium composite oxide particles is 100% by weight). More preferably, the amount is from 0.2 to 3% by weight.

Examples of the carbon material precursor include pitches, resins, acids, alcohols, saccharides, phenols, and cellulose. Preferable examples thereof include organic compounds in which the atomic ratio ($\gamma/\sigma$) is in the range of $0 \leq (\gamma/\sigma) \leq 0.1$ at low heat treatment temperatures. For example, it is preferable to use carboxymethylcellulose (CMC) or sucrose as the carbon precursor. On the other hand, a method comprising: evaporating a carbon material precursor; vapor-depositing such on the particle surface; and subjecting such to a heat treatment may be used in place of the method of covering the oxide powder containing the monoclinic niobium titanium composite oxide with a carbon material precursor.

The ratio ($\alpha/\beta$) of the mole number of Nb to the mole number of Ti and the ratio ($\gamma/\sigma$) of the number of hydrogen atoms to the number of carbon atoms in the carbon material layer may be calculated, for example, by the following method.

When the active material is first taken out from the nonaqueous electrolyte battery, the battery is disassembled in a dry atmosphere after being discharged and the active material powder is taken out from the negative electrode. The resulting active material is washed with an organic solvent (diethyl carbonate solvent, etc.) to dissolve and remove lithium salt and dried. Thereafter, the active material is sufficiently washed with water in air to remove the remaining lithium ions. The resulting produce is used as an active material to be measured.

As for the ratio ($\alpha/\beta$) of the mole number of Nb to the mole number of Ti, Ti and Nb are first quantified and analyzed using Inductively Coupled Plasma (ICP) analysis as the elemental analysis. The mole number of Nb ($\alpha$) and the mole number of Ti ($\beta$) are determined and the ratio ($\alpha/\beta$) thereof is determined. Further, other metallic elements are quantified and analyzed in the same manner as described above.

Further, in the method of measuring the ratio ($\gamma/\sigma$) of the number of hydrogen atoms to the number of carbon atoms in the carbon material layer, niobium titanium composite oxide powder in which at least a part of the surface thereof is covered with the carbon material layer (i.e., the same active material as described above) is subjected to an elemental analysis to perform a quantitative analysis of hydrogen and carbon, and the atomic ratio ($\gamma/\sigma$) is determined. In this regard, the detection limit of the elemental-analysis measurement is defined as the case where the atomic ratio ($\gamma/\sigma$) is 0.

In this regard, the niobium titanium composite oxide synthesized by the above-described method may be used as the negative electrode active material to allow it to absorb lithium ions or sodium ions during charging the battery. Alternatively, compounds such as hydroxides and carbonates including lithium or sodium may be used as the starting materials to synthesize a composite oxide containing lithium or sodium.

According to the first embodiment described above, it is possible to provide an active material for a battery having a high capacity and excellent in large current discharge performance and cycle life performance in the case where the ratio ($\alpha/\beta$) of the mole number of Nb to the mole number of Ti in the monoclinic niobium titanium composite oxide particles satisfies Formula (1) and the ratio ($\gamma/\sigma$) of the number of hydrogen atoms to the number of carbon atoms in the carbon material layer satisfies Formula (2).

(Second Embodiment)

According to a second embodiment, there is provided a nonaqueous electrolyte battery including a positive electrode, a negative electrode, and a nonaqueous electrolyte. The negative electrode contains the active material of the first embodiment. The battery of the second embodiment may include a separator which is disposed between the positive electrode and the negative electrode and further may include a case which houses these electrodes and the nonaqueous electrolyte.

Hereinafter, the negative electrode, the positive electrode, the nonaqueous electrolyte, the separator, and the case will be described.

1) Negative Electrode

The negative electrode includes a negative electrode current collector and a negative electrode material layer including the active material according to the first embodiment, a conductive agent, and a binder, which is supported on one surface or both sides of the current collector.

The porosity of the negative electrode (excluding the current collector) is preferably adjusted to a range of 20 to 50%. Thus, it is possible to produce a negative electrode having excellent affinity of the negative electrode with the nonaqueous electrolyte and high density. The porosity is more preferably from 25 to 50%.

The negative electrode current collector is desirably a metal foil such as an aluminum foil, a copper foil, a stainless steel foil, a nickel foil or a carbon-coated metal foil. The thickness of the metal foil is 20 µm or less, preferably 15 µm or less.

Examples of the conductive agent may include acetylene black, carbon black, coke, carbon fiber, graphite, metal compound powder, and metal powder. The kind of the conductive agent may be one kind or two or more kinds.

Examples of the binder include polytetrafluoroethylene (PTFE), polyvinylidene fluoride (PVdF), fluorine rubber, styrene butadiene rubber, and core shell binders. The kind of the binder may be one kind or two or more kinds.

As for the compounding ratio of the negative electrode active material, the conductive agent, and the binder, it is preferable that the content of the negative electrode active material is from 90 to 99% by weight, the content of the conductive agent is from 0 to 8% by weight, and the content of the binder is from 2 to 7% by weight.

The negative electrode is produced, for example, by suspending the active material according to the first embodiment, a conductive agent, and a binder in an appropriate solvent, applying the slurry to the current collector, drying it, and heat-pressing it.

2) Positive Electrode

The positive electrode includes a positive electrode current collector and a positive electrode material layer including an active material, a conductive agent, and a binder, which is supported on one surface or both sides of the current collector.

Examples of the active material of the positive electrode include lithium metal oxide containing Ni, lithium cobalt oxide ($LiCoO_2$), lithium manganese oxide having a spinel structure ($LiMn_2O_4$, $LiMn_{1.5}Ni_{0.5}O_4$), lithium iron phosphate having an olivine crystal structure ($LiFePO_4$, $LiMn_{1-x-y}Fe_xMg_yPO_4$ where $0<x<0.5$ and $0<y<0.5$), lithium manganese phosphate ($LiMnPO_4$), lithium manganese iron phosphate ($LiMn_{1-x}Fe_xPO_4$, $0<x\leq0.5$), fluorinated lithium iron sulfate ($LiFeSO_4F$), lithium manganese nickel oxide having a spinel crystal structure ($LiMn_{1.5}Ni_{0.5}O_4$), sodium iron oxide ($NaFeO_2$), sodium nickel titanium oxide ($NaNi_{1-x}Ti_xO_2$, $0<x<1$), sodium/nickel iron oxide ($NaNi_{1-x}Fe_xO_2$, $0<x<1$), sodium nickel manganese oxide ($NaNi_{1-x}Mn_xO_2$, $0<x<1$), and polyanionic active materials. Examples of the polyanionic active materials include phosphate containing sodium {e.g., $Na_3V_2(PO_4)_3$, $Na_2FePO_4F$, $Na_3V_2(PO_4)_2F_3$, $Na_4Ni_3(PO_4)_2P_2O_7$, $Na_4Mn_3(PO_4)_2P_2O_7$}. Further, graphite that absorbs anions in a nonaqueous electrolyte, a carbon material or activated carbon having capacitor capacity may be used as the positive electrode.

Examples of the lithium metal oxide containing Ni include lithium nickel oxide ($LiNiO_2$), lithium nickel cobalt oxide ($LiNi_aCo_{1-a}O_2$), lithium nickel cobalt aluminum oxide ($LiNi_aCo_bAl_{1-a-b}O_2$), and lithium nickel cobalt manganese oxide ($LiNi_aCo_bMn_{1-a-b}O_2$), lithium nickel cobalt manganese oxide ($LiNi_aCo_bMn_{1-a-b}O_4$ where $0<a<1$, $0<b<1$, and $0<(1-a-b)<1$). Here, when the lithium metal oxide containing Ni is represented by the general formula $LiNi_xM_{1-x}O_2$ (M represents at least one kind of metal other than Ni), x is preferably from 0.5 to 1. An oxide which satisfies this range has a high capacity and a high energy density. Thus, when it is combined with the active material according to the embodiments, the high-temperature cycle life performance, high-output performance, and safety can be improved.

More preferable positive electrode materials include iron oxides such as $LiFePO_4$ and $NaFeO_2$ from the viewpoint of cycle life performance. $LiNi_xM_{1-x}O_2$ (M represents at least one kind of metal other than Ni and $0.5 \leq x \leq 1$) is preferred from the viewpoint of capacity.

Examples of the conductive agent may include acetylene black, carbon black, graphite, and carbon fiber.

Examples of the binder include polytetrafluoroethylene (PTFE), polyvinylidene fluoride (PVdF), and fluorine rubber.

The kind of the positive electrode active material, conductive agent, and binder used herein may be one kind or two or more kinds.

As for the compounding ratio of the positive electrode active material, the conductive agent, and the binder, it is preferable that the content of the positive electrode active material is from 80 to 95% by weight, the content of the conductive agent is from 3 to 19% by weight, and the content of the binder is from 1 to 7% by weight.

The positive electrode is produced, for example, by suspending the positive electrode active material, conductive agent, and binder in an appropriate solvent, applying the slurry to a current collector formed of aluminum foil or aluminum alloy foil, drying it, and pressing it. The specific surface area of the positive electrode material layer in accordance with the BET method is preferably from 0.1 to 10 $m^2/g$.

As the current collector, an aluminum foil or aluminum alloy foil is preferred. The thickness of the current collector is 20 μm or less, preferably 15 μm or less.

3) Nonaqueous Electrolyte

Examples of the nonaqueous electrolyte include a liquid organic electrolyte prepared by dissolving an electrolyte in an organic solvent, a gel-like organic electrolyte obtained by compounding a liquid organic solvent and a polymer material or a solid nonaqueous electrolyte obtained by compounding a lithium salt electrolyte and a polymer material. Further, a room temperature molten salt (ionic melt) containing lithium ions may be used as the nonaqueous electrolyte. Examples of the polymer material may include polyvinylidene fluoride (PVdF), polyacrylonitrile (PAN), and polyethylene oxide (PEO).

The liquid organic electrolyte is prepared by dissolving an electrolyte in an organic solvent at a concentration of 0.5 to 2.5 mol/L.

As the electrolyte, the lithium salt or sodium salt may be used. Examples thereof include $NaLiB_4$, $LiBF_4$, $NaLiPF_6$, $LiPF_6$, $NaAsF_6$, $LiAsF_6$, $NaClO_4$, $LiClO_4$, $NaCF_3SO_3$, $NaN(CF_3SO_2)_2$, $NaN(CF_3SO_2)_2$, $Na(CF_3SO_2)_3C$, $NaB[(OCO)_2]_2$, $LiCF_3SO_3$, $LiN(CF_3SO_2)_2$, $LiN(C_2F_5SO_2)_2$, $Li(CF_3SO_2)_3C$, and $LiB[(OCO)_2]_2$. The kind of the electrolyte to be used may be one or two or more kinds. Among them, lithium tetrafluoroborate ($LiBF_4$), sodium tetrafluoroborate ($NaBF_4$), lithium hexafluorophosphate ($LiPF_6$), sodium hexafluorophosphate ($NaPF_6$) are preferably included. Thus, the chemical stability of the organic solvent can be improved and the film resistance on the negative electrode can be reduced, resulting in significant improvement in low temperature performance and cycle life performance.

Examples of the organic solvent include cyclic carbonates such as propylene carbonate (PC) and ethylene carbonate (EC); linear carbonates such as diethyl carbonate (DEC) and dimethyl carbonate (DMC), and methylethyl carbonate (MEC); linear ethers such as dimethoxyethane (DME) and diethoxy ethane (DEE); cyclic ethers such as tetrahydrofuran (THF) and dioxolane (DOX); γ-butyrolactone (GBL), acetonitrile (AN), and sulfolane (SL). These organic solvents can be used alone or in the form of a mixture of two or more kinds thereof. These organic solvents may be used alone or in the form of a mixture of two or more kinds thereof. It is preferred to mainly include one or more kinds selected from the group consisting of propylene carbonate (PC), ethylene carbonate (EC), and γ-butyrolactone (GBL), since the boiling point becomes 200° C. or more and the thermal stability becomes higher. Particularly, it is preferred to include γ-butyrolactone (GBL), since the output performance at low temperatures increases. Since it is possible to dissolve a lithium salt in a solvent at a high concentration, 1.5 to 2.5 mol/L of the lithium salt is preferably dissolved in an organic solvent. This is because high output can be attained even at low temperatures. When the concentration of the Lithium salt is set to 1.5 mol/L or more, it is possible to avoid the concentration of lithium ions at the interface between the positive electrode and the electrolyte solution being suddenly decreased during discharge at a large current and to suppress a large output reduction. On the other hand, when the viscosity of the nonaqueous electrolyte is decreased by setting the concentration of the lithium salt to 2.5 mol/L or less, the moving velocity of lithium ions can be made higher and high output can be obtained.

The room temperature molten salt (ionic melt) preferably includes one of a lithium ion and a sodium ion, an organic cation, and an organic anion. It is preferable that the room temperature molten salt remains in a liquid form even at room temperature or less.

Hereinafter, an electrolyte containing a room temperature molten salt will be described.

The room temperature molten salt means a salt in which at least a part of the salt exhibits a liquid form at room temperature. The room temperature means a temperature range in which the power source is assumed to be normally operated. As for the temperature range in which the power source is assumed to be normally operated, the upper limit is about 120° C., in some cases about 60° C. The lower limit is about −40° C., in some cases about −20° C. Among them, the temperature range of −20° C. to 60° C. is suitable.

As the room temperature molten salt containing lithium ions or sodium ions, it is desirable to use an ionic melt including lithium ions or sodium ions and organic cations and anions. Further, the ionic melt is preferably in the state of liquid at room temperature.

Examples of the organic cation include alkyl imidazolium ions having a skeleton shown in Chemical Formula 1 below and quaternary ammonium ions.

[Chemical Formula 1]

Formula (1)

Preferable alkyl imidazolium ions may include dialkyl imidazolium ions, trialkyl imidazolium ions, and tetraalkyl imidazolium ions. Preferable dialkyl imidazolium may include 1-methyl-3-ethyl imidazolium ions (MEI$^+$). Preferable trialkyl imidazolium ions may include 1,2-diethyl-3-propyl imidazolium ions (DMPI$^+$). Preferable tetraalkyl imidazolium ions may include 1,2-diethyl-3,4(5)-dimethyl imidazolium ions.

Preferable quaternary ammonium ions may include tetraalkyl ammonium ions and cyclic ammonium ions. Preferable tetraalkyl ammonium ions may include dimethyl ethyl methoxyethyl ammonium ions, dimethyl ethyl methoxymethyl ammonium ions, dimethyl ethyl ethoxyethyl ammonium ions, and trimethyl propyl ammonium ions.

When the alkyl imidazolium ions or the quaternary ammonium ions (especially tetraalkyl ammonium ions) are used, the melting point can be adjusted to 100° C. or less, more preferably 20° C. or less. Further, the reactivity with the negative electrode can be reduced.

The concentration of the lithium ions is preferably 20 mol % or less, more preferably from 1 to 10 mol %. When the concentration is adjusted to the range described above, the liquid room temperature molten salt can be easily obtained even at a low temperature such as 20° C. or less. Also, the viscosity can be reduced even at temperatures lower than room temperature, thus resulting in the enhanced ion conductivity.

The anion preferably coexists with one or more anions selected from $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$, and $(CF_3SO_2)_3C^-$. The anions are coexistent so that a room temperature molten salt having a melting point of 20° C. or less can be easily formed. More preferable examples of the anion include $BF_4^-$, $(FSO_2)2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. These anions allow a room temperature molten salt at 0° C. or less to be more easily formed.

4) Separator

A separator can be arranged between the positive electrode and the negative electrode. As the separator, an olefin-based porous film such as polyethylene (PE) or polypropylene (PP) or a cellulose fiber film can be used. The porosity of the separator can be set to 50% or more. Further, a separator whose surface is coated with an inorganic powder can be used.

The fiber diameter of the cellulose fiber is preferably set to 10 μm or less. Examples of the form of the cellulose fiber separator include non-woven fabric, film, and paper forms. Particularly, if the cellulose fiber separator has a porosity of 60%, the impregnation properties of the nonaqueous electrolyte are good. High output performance from low to high temperatures can be attained. The porosity is more preferably from 62 to 80%. When the separator of cellulose fiber having a porosity of 60% or more is combined with the negative electrode containing the active material according to the first embodiment, the reaction of the separator with the negative electrode during long-term charge storage, float charge, and over-charge can be suppressed. Further, short circuiting of the negative electrode and the positive electrode due to the deposition of lithium metal (dendrites) can be avoided. Further, when the fiber diameter is set to 10 μm or less, the affinity of the separator with the nonaqueous electrolyte is improved. Thus, the battery resistance can be reduced. More preferably, the fiber diameter is 3 μm or less.

Preferably, the thickness of the separator is from 20 to 100 μm and the density is from 0.2 to 0.9 g/cm$^3$. When these items are in the above ranges, the balance between mechanical strength and a reduction in battery resistance can be kept and therefore, a battery which has high output and is reduced in the development of internal short circuits can be provided. Further, heat-shrinkage in hot environments is reduced and good high-temperature-storage performance can be attained.

5) Case

As the case housing the positive electrode, the negative electrode, and the nonaqueous electrolyte, a metal case or a case substantially formed of a laminate film can be used.

As the metal case, a prismatic or cylindrical-type metal can formed of aluminum, an aluminum alloy, iron or stainless steel can be used. The thickness of the case is set to preferably 0.5 mm or less, more preferably 0.3 mm or less.

Examples of the laminate film include a multilayer film obtained by covering an aluminum foil with a resin film. Polymers such as polypropylene (PP), polyethylene (PE), nylon, or polyethylene terephthalate (PET) can be used for the resin. The thickness of the laminate film is preferably set to 0.2 mm or less. The purity of the aluminum foil is preferably 99.5% by weight or more.

The metal can includes an aluminum alloy preferably formed of an alloy having an aluminum purity of 99.8% by weight or less which contains elements such as manganese, magnesium, zinc, or silicon. The thickness of the can be reduced by increasing the strength of the metal can that includes an aluminum alloy. As a result, a thin, light-weight, and high power battery having an excellent heat releasing property can be attained.

Figure 2:
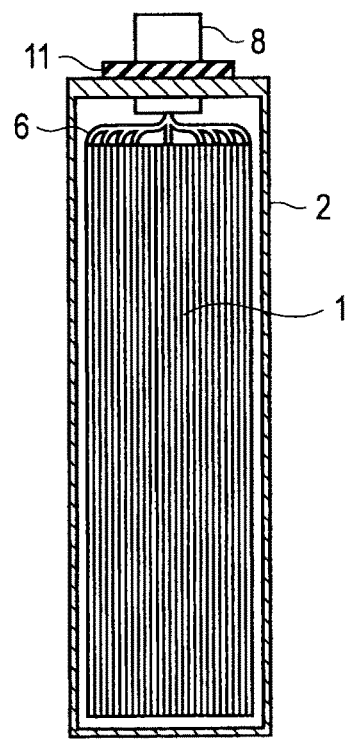
FIG. 2 is a side view of the battery of FIG. 1.

A prismatic secondary battery according to the second embodiment is shown in FIGS. 1 to 2. As shown in FIG. 1, an electrode group 1 is housed in a rectangular cylindrical metal case 2. The electrode group 1 has a structure in which a separator 5 is provided between a positive electrode 3 and a negative electrode 4 and spirally wound to form a flat shape. A nonaqueous electrolyte (not shown) is supported by the electrode group 1. As shown in FIG. 2, strip-shaped positive electrode leads 6 are electrically connected to a plurality of places of the end of the positive electrode 3 which are located on the end surface of the electrode group 1. Further, strip-shaped negative electrode leads 7 are electrically connected to a plurality of places of the end of the negative electrode 4 which are located on the end surface. A bundle of the positive electrode leads 6 is electrically connected to a positive electrode conductive tab 8. A positive electrode terminal is formed of the positive electrode leads 6 and the positive electrode conductive tab 8. A bundle of the negative electrode leads 7 is connected to a negative electrode conductive tab 9. A negative electrode terminal is formed of the negative electrode leads 7 and the negative electrode conductive tab 9. A metal sealing plate 10 is fixed to the opening of a metal case 2 by welding or the like. The positive electrode conductive tab 8 and the negative electrode conductive tab 9 are pulled out from pick-up holes formed in the sealing plate 10 to the outside. The inner periphery surface of each pick-up hole of the sealing plate 10 is covered with an insulating member 11 in order to prevent short circuits due to the contact of the positive electrode conductive tab 8 and the negative electrode conductive tab 9.

In this regard, the kind of the battery is not limited to the prismatic and various kinds, such as a cylindrical-type, thin-type, and coin-type can be used. The shape of the electrode group is not limited to a flat shape. For example, the shape may be cylindrical, laminated or the like.

According to the nonaqueous electrolyte battery of the second embodiment, it is possible to provide a nonaqueous electrolyte battery having a high capacity and excellent in large current discharge performance and cycle life performance, because a negative electrode containing the active material of the first embodiment is included.

(Third Embodiment)

A battery pack according to the third embodiment includes one or more nonaqueous electrolyte batteries according to the second embodiment. The battery pack may comprise a battery module including a plurality of batteries. The batteries may be connected in series or parallel. Preferably, they are connected in series. Preferably, the number of series-connected batteries for connection is a multiple n of 6 (n represents an integer of 1 or more).

Figure 3:
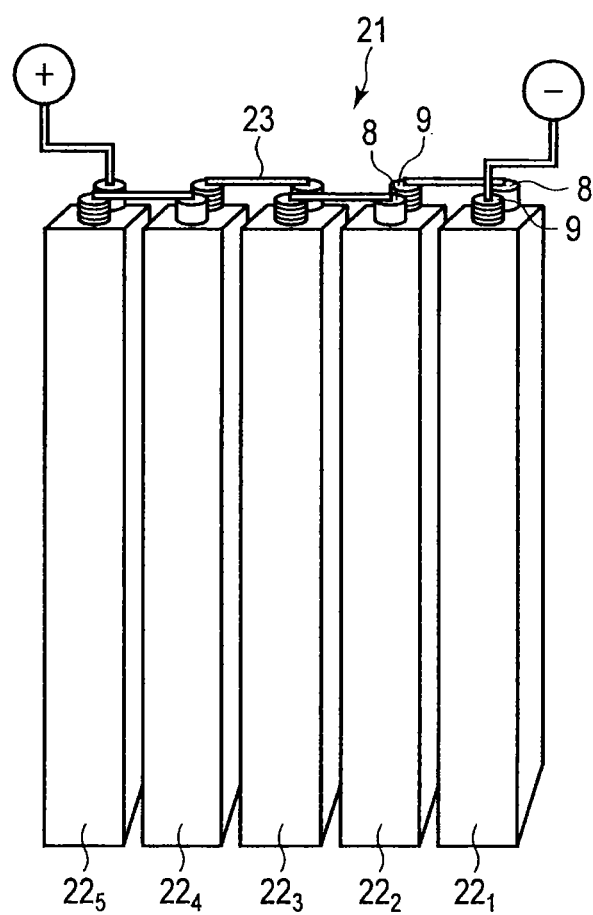
FIG. 3 is a perspective view showing an example of a battery module used for a battery pack of an embodiment.

An embodiment of a battery module used for a battery pack is shown in FIG. 3. A battery module 21 shown in FIG. 3 comprises a plurality of prismatic secondary batteries $22_1$ to $22_5$ according to the second embodiment. The positive electrode conductive tab 8 of the secondary battery $22_1$ and the negative electrode conductive tab 9 of the secondary battery $22_2$ located next to the secondary battery $22_1$ are electrically connected by a lead 23. Further, the positive electrode conductive tab 8 of the secondary battery $22_2$ and the negative electrode conductive tab 9 of the secondary battery $22_3$ located next to the secondary battery $22_2$ are electrically connected by the lead 23. Thus, the secondary batteries $22_1$ to $22_5$ are connected in series.

As a container that houses the battery module, a metal can formed of aluminum alloy, iron or stainless steel, a plastic case or the like can be used. The thickness of the case is preferably set to 0.5 mm or more.

The form of the battery pack is appropriately changed according to the use. The battery pack which has an excellent cycle characteristics and an excellent high current characteristics is preferred. Specifically, the use of the battery pack for power sources for digital cameras, the use of the battery pack for vehicles such as two- or four-wheel hybrid electric vehicles, two- or four-wheel electric vehicles, and assisted bicycles or the like are listed.

The use of the battery pack for vehicles is preferred.

According to the third embodiment, it is possible to realize a battery pack having a high capacity and excellent in large current discharge performance and cycle life performance, because the nonaqueous electrolyte battery according to the second embodiment is included.

EXAMPLES

Examples of the present invention will be hereinafter described in detail with reference to the drawings. However, the present invention is not limited thereto.

Example 1

As a positive electrode active material, an olivine structure of lithium iron phosphate ($LiFePO_4$) having an average primary particle diameter of 0.5 μm was used. By weight, 5% of acetylene black as a conductive agent based on the total amount of the positive electrode and 5% by weight of PVdF as a binder based on the total amount of the positive electrode were added to the positive electrode active material. The mixture was dispersed into an n-methylpyrrolidone (NMP) solvent to prepare a slurry. Thereafter, the obtained slurry was applied to a 15-μm-thick aluminum alloy foil (purity: 99% by weight), which was then treated through drying and pressing processes to produce a positive electrode in which the thickness of the positive electrode material layer on one surface was 38 μm and the electrode density was 2.0 g/cm³.

Subsequently, titanium oxide powder (anatase type $TiO_2$) having an average particle size of 0.1 μm and niobium pentoxide powder ($Nb_2O_5$) having an average particle size of 0.1 μm were weighed so as to have a mole ratio of 1:1 and mixed. The resulting powder was subjected to a heat treatment at 1000° C. for 20 hours. A diffraction diagram of the resulting sample was obtained by powder X-ray diffraction measurement. The results of crystal structure analysis according to the Rietveld method showed that the synthesized sample had a monoclinic crystal structure.

The mole ratio of elements of Ti and Nb was obtained by ICP analysis. In the ICP analysis, specifically, once an active material as a sample is weighted and placed in a Pt crucible. The material is decomposed by alkali fusion to produce a measurement solution. Then, Nb and Ti can be quantified and measured by ICP spectrometry using an internal standard method (SPS-4000, manufactured by SII Nanotechnology Inc.). As a result, the sample was represented by TiNb$_2$O$_7$ and the ratio ($\alpha/\beta$) of the mole number of Nb to the mole number of Ti was 2. Subsequently, this sample was mixed with 5% by weight of carboxymethylcellulose (CMC) and ethanol was added thereto. The resulting mixture was ground and uniformly mixed using a ball mill, followed by a heat treatment at 750° C. in a nitrogen atmosphere for 1 hour. The average primary particle diameter of the resulting sample was 0.3 µm according to the SEM observation (magnification: 1000 times). The secondary particle diameter was 3 µm. The specific surface area measured by the BET adsorption method based on N$_2$ adsorption was 10 m$^2$/g. As a result of the combustion treatment of the sample in an air atmosphere, the amount of carbon coating was 1% by weight. Further, the elemental-analysis results showed that the ratio ($\gamma/\sigma$) of the number of hydrogen atoms to the number of carbon atoms was 0.05.

The TiNb$_2$O$_7$ powder with the carbon material layer, graphite powder, and PVdF as a binder were mixed at a weight ratio of 90:6:4. The mixture was dispersed into an n-methylpyrrolidone (NMP) solvent, which was stirred at a rotating speed of 1000 rpm for 2 hours using a ball mill to prepare a slurry. The obtained slurry was applied to a 15-µm-thick aluminum foil (purity: 99.3% by weight), which was then treated through drying and heat-pressing processes to produce a negative electrode in which the thickness of the negative electrode material layer on one surface was 30 µm and the electrode density was 2.9 g/cm$^3$. The BET specific surface area of the negative electrode material layer (surface area per 1 g of the negative electrode material layer) was 5 m$^2$/g.

On the other hand, the positive electrode was covered with a separator of regenerated cellulose fiber obtained from a pulp as a raw material (having a thickness of 15 µm, a porosity of 65%, and an average fiber diameter of 1 µm). The negative electrode was superimposed thereon and faced the separator provided on the positive electrode. The positive active material layer was covered with the negative electrode active material layer via the separator, and these were spirally wound to produce an electrode group.

The electrode group was pressed to be molded into a flat shape. The electrode group was housed in a case of a thin metal can formed of a 0.3 mm-thick aluminum alloy (Al purity: 99% by weight).

On the other hand, 1 mol/L of lithium hexafluorophosphate (LiPF$_6$) as lithium salt was dissolved in a mixed solvent of propylene carbonate (PC), ethylene carbonate (EC), and diethyl carbonate (DEC) (volume ratio of 25:25:50) as an organic solvent to prepare a liquid organic electrolyte (nonaqueous electrolyte). The nonaqueous electrolyte was injected into the electrode group in the case to produce a thin-type nonaqueous electrolyte secondary battery having the structure shown FIG. 1, a thickness of 14 mm, a width of 62 mm, and a height of 94 mm. The discharge capacity of the battery was 7.5 Ah, and the intermediate voltage (voltage when discharged to 50%) was 1.9 V.

In the measurement of the secondary particles of the negative electrode active material, a laser diffraction type distribution measurement device (SALD-300, Shimadzu Corporation) was used. First, about 0.1 g of a sample, a surfactant, and 1 to 2 mL of distilled water were added to a beaker and sufficiently stirred. The mixture was placed to an agitation bath and the luminous intensity distribution was measured at intervals of 2 seconds 64 times. The particle size was measured by a method of analyzing particle size distribution data.

The BET specific surface area, based on N$_2$ adsorption, of the negative electrode active material and the negative electrode was measured under the following conditions. One g of the negative electrode active material powder or two negative electrodes cut into a size of 2×2 cm$^2$ were used as samples. The BET specific surface area measurement device (manufactured by Yuasa Ionics Co., Ltd.) was used. As the adsorption gas, nitrogen gas was used.

In this regard, the porosity of the negative electrode was calculated by comparing the volume of the negative electrode material layer with the volume of the negative electrode material layer in the case of a porosity of 0% and determining an increase in the negative electrode material layer in the case of a porosity of 0% as a hole volume. In this regard, the volume of the negative electrode material layer is a total of the volumes of both sides of the negative electrode material layer in the case where the negative electrode material layer is formed on both sides of the collector.

Examples 2 to 19 and Comparative Examples 1 to 5

Thin-type nonaqueous electrolyte secondary batteries were produced in the same manner as described in Example 1 except that the mole ratio ($\alpha/\beta$), the mole number y of the element M, the kind and mole ratio of the element M to be added, the primary particle diameter, the atomic ratio ($\gamma/\sigma$), the carbon heat treatment temperature, the positive electrode active material, and the electrolyte were set as shown in Tables 1 and 2 below.

The resulting secondary batteries of Examples 1 to 19 and Comparative examples 1 to 5 were charged up to 3.0 V with a constant current of 1 C rate at 25° C. for 1.5 hours and discharged at 1 C rate to 1.5 V, thereby the discharge capacity and intermediate voltage (voltage when discharged to 50%) were measured. As the cycle test, the charge and discharge cycle was repeated at 25° C. under the above conditions. The cycle number when the rate of decrease of capacity reached to 20% was defined as the number of cycle life. As the large current discharge performance, the capacity-maintenance ratio of the 10 C discharge capacity to the 1 C discharge capacity was calculated. These measurement results are shown in Tables 3 and 4 below.

TABLE 1

| | Mole ratio ($\alpha/\beta$) | Mole number y of element M | M (mole ratio) | Primary particle diameter (µm) | Atomic ratio ($\gamma/\sigma$) | Carbonization temperature (° C.) | Electrolyte | Positive electrode active material |
|---|---|---|---|---|---|---|---|---|
| Example 1 | 2 | 0 | — | 0.3 | 0.05 | 700 | LiPF$_6$ | LiFePO$_4$ |
| Example 2 | 1 | 0 | — | 0.3 | 0.08 | 650 | LiPF$_6$ | LiFePO$_4$ |
| Example 3 | 1.8 | 0 | — | 0.3 | 0.05 | 700 | LiPF$_6$ | LiFePO$_4$ |
| Example 4 | 0.5 | 0 | — | 0.3 | 0.05 | 700 | LiPF$_6$ | LiFePO$_4$ |

TABLE 1-continued

| | Mole ratio (α/β) | Mole number y of element M | M (mole ratio) | Primary particle diameter (μm) | Atomic ratio (γ/σ) | Carbonization temperature (° C.) | Electrolyte | Positive electrode active material |
|---|---|---|---|---|---|---|---|---|
| Example 5 | 1 | 0 | — | 0.3 | 0.01 | 800 | $LiPF_6$ | $LiFePO_4$ |
| Example 6 | 1.5 | 0 | — | 0.3 | 0.01 | 800 | $LiPF_6$ | $LiFePO_4$ |
| Example 7 | 1 | 0 | — | 0.1 | 0.01 | 800 | $LiPF_6$ | $LiFePO_4$ |
| Example 8 | 1.875 | 0.125 | Mo(0.1), Mg(0.025) | 0.1 | 0.05 | 700 | $LiPF_6$ | $LiFePO_4$ |
| Example 9 | 1.9 | 0.1 | V(0.1) | 0.15 | 0.05 | 700 | $LiPF_6$ | $LiFePO_4$ |
| Example 10 | 1.875 | 0.125 | W(0.1), Mg(0.025) | 0.1 | 0.05 | 700 | $LiPF_6$ | $LiFePO_4$ |
| Example 11 | 1.5 | 0.125 | Mo(0.1), Sn(0.025) | 0.1 | 0.05 | 700 | $LiPF_6$ | $LiFePO_4$ |
| Example 12 | 1.9 | 0.1 | V(0.09), Fe(0.01) | 0.15 | 0.05 | 700 | $LiPF_6$ | $LiFePO_4$ |
| Example 13 | 1.9 | 0.1 | V(0.09), Al(0.01) | 0.2 | 0.05 | 700 | $LiPF_6$ | $LiFePO_4$ |
| Example 14 | 1 | 0 | — | 0.3 | 0.01 | 800 | $NaPF_6$ | $NaNi_{0.5}Ti_{0.5}O_2$ |
| Example 15 | 2 | 0 | — | 0.3 | 0.01 | 800 | $NaPF_6$ | $NaFeO_2$ |
| Example 16 | 1.85 | 0.125 | Mo(0.1), Mg(0.025) | 0.1 | 0.05 | 700 | $NaPF_6$ | $NaNi_{0.5}Ti_{0.5}O_2$ |
| Example 17 | 1 | 0 | — | 0.3 | 0 | 1100 | $LiPF_6$ | $LiFePO_4$ |
| Example 18 | 1.9 | 0 | — | 0.3 | 0.1 | 600 | $LiPF_6$ | $LiFePO_4$ |
| Example 19 | 0.8 | 0 | — | 0.3 | 0.01 | 800 | $LiPF_6$ | $LiFePO_4$ |

TABLE 2

| | Mole ratio (α/β) | Mole number y of element M | M (mole ratio) | Primary particle diameter (μm) | Atomic ratio (γ/σ) | Carbonization temperature (° C.) | Electrolyte | Positive electrode active material |
|---|---|---|---|---|---|---|---|---|
| Comparative Example 1 | 2 | 0 | — | 2 | — | — | $LiPF_6$ | $LiFePO_4$ |
| Comparative Example 2 | 3 | 0 | — | 4 | — | — | $LiPF_6$ | $LiFePO_4$ |
| Comparative Example 3 | 2.5 | 0 | — | 4 | 0.2 | 550 | $LiPF_6$ | $LiFePO_4$ |
| Comparative Example 4 | 0.4 | 0 | — | 2 | 0.2 | 550 | $LiPF_6$ | $LiFePO_4$ |
| Comparative Example 5 | 2.2 | 0 | — | 2 | 0.05 | 700 | $LiPF_6$ | $LiFePO_4$ |

TABLE 3

| | Discharge capacity (Ah) | Intermediate voltage (V) | Cycle life (times) | Capacity-maintenance ratio during large current discharge at 10 C. (%) |
|---|---|---|---|---|
| Example 1 | 7.5 | 1.9 | 3000 | 70 |
| Example 2 | 7.0 | 1.9 | 3500 | 85 |
| Example 3 | 7.6 | 1.9 | 3500 | 75 |
| Example 4 | 6.0 | 1.9 | 4000 | 85 |
| Example 5 | 7.0 | 1.9 | 5000 | 90 |
| Example 6 | 7.3 | 1.9 | 4500 | 85 |
| Example 7 | 7.0 | 1.9 | 5000 | 90 |
| Example 8 | 7.3 | 1.9 | 3600 | 95 |
| Example 9 | 7.0 | 1.9 | 5000 | 90 |
| Example 10 | 7.1 | 1.9 | 3500 | 85 |
| Example 11 | 7.3 | 1.9 | 4000 | 85 |
| Example 12 | 7.4 | 1.9 | 4000 | 85 |
| Example 13 | 7.2 | 1.9 | 4000 | 80 |
| Example 14 | 6.0 | 2.3 | 3000 | 70 |
| Example 15 | 5.5 | 2.3 | 2500 | 65 |
| Example 16 | 6.2 | 2.0 | 3000 | 65 |
| Example 17 | 6.9 | 1.9 | 3600 | 90 |
| Example 18 | 7.7 | 1.9 | 3500 | 70 |
| Example 19 | 6.2 | 1.9 | 5000 | 80 |

TABLE 4

| | Discharge capacity (Ah) | Intermediate voltage (V) | Cycle life (times) | Capacity-maintenance ratio during large current discharge at 10 C. (%) |
|---|---|---|---|---|
| Comparative Example 1 | 4.5 | 1.9 | 300 | 33 |
| Comparative Example 2 | 5.0 | 1.9 | 200 | 20 |
| Comparative Example 3 | 4.8 | 1.9 | 250 | 30 |
| Comparative Example 4 | 4.0 | 1.9 | 500 | 35 |
| Comparative Example 5 | 3.5 | 1.9 | 100 | 40 |

As is clear from Tables 1 to 4, the batteries in Examples 1 to 19 are excellent in capacity, cycle life, and large current discharge performance as compared to those in Comparative examples 1 to 5. Particularly, the batteries of Examples 1, 3, 6, 8, and 12 were excellent in capacity. The batteries of Examples 5, 7, 8, and 9 were excellent in large current discharge performance. The batteries of Examples 5, 7, and 9 were excellent in cycle life performance. In batteries of Examples 14, 15, and 16, the intermediate battery voltage was able to be increased by using a positive electrode absorbing and releasing Na ions.

On the other hand, the batteries of Comparative examples 1 and 2 not having the carbon material layer were inferior in capacity, cycle life, and large current discharge performance regardless of the mole ratio ($\alpha/\beta$). Further, the batteries of Comparative examples 3 to 5 in which the mole ratio ($\alpha/\beta$) was beyond the range of $0.5 \leq (\alpha/\beta) \leq 2$ were inferior in capacity, cycle life, and large current discharge performance regardless of the atomic ratio ($\gamma/\sigma$) of the carbon material layer.

Examples 20 to 24

Thin-type nonaqueous electrolyte secondary batteries were produced in the same manner as described in Example 1 except that the mole ratio ($\alpha/\beta$), the mole number y of the element M, the kind and mole ratio of the element M to be added, the primary particle diameter, the atomic ratio ($\gamma/\sigma$), the carbon heat treatment temperature, the positive electrode active material, and the electrolyte were set as shown in Table 5 below.

The cycle life, the large current discharge performance, and the capacity-maintenance ratio of the 10 C discharge capacity to the 1 C discharge capacity for the resulting secondary batteries of Examples 20 to 24 were measured in the same manner as described in Example 1. These measurement results are shown in Table 6 below.

TABLE 5

|  | Mole ratio ($\alpha/\beta$) | Mole number y of element M | M (mole ratio) | Primary particle diameter (μm) | Atomic ratio ($\gamma/\sigma$) | Carbonization temperature (° C.) | Electrolyte | Positive electrode active material |
|---|---|---|---|---|---|---|---|---|
| Example 20 | 2 | 0 | — | 0.3 | 0.05 | 700 | LiPF$_6$ | LiMn$_{0.8}$Mg$_{0.05}$Fe$_{0.15}$PO$_4$ |
| Example 21 | 2 | 0 | — | 0.3 | 0.05 | 700 | LiPF$_6$ | LiMn$_{0.8}$Fe$_{0.15}$PO$_4$ |
| Example 22 | 2 | 0 | — | 0.3 | 0.05 | 700 | LiPF$_6$ | LiFeSO$_4$F |
| Example 23 | 2 | 0 | — | 0.3 | 0.05 | 700 | LiPF$_6$ | LiMn$_2$O$_4$ |
| Example 24 | 2 | 0 | — | 0.3 | 0.05 | 700 | LiPF$_6$ | LiNi$_{0.5}$Co$_{0.2}$Mn$_{0.3}$O$_4$ |

TABLE 6

|  | Discharge capacity (Ah) | Intermediate voltage (V) | Cycle life (times) | Capacity-maintenance ratio during large current discharge at 10 C. (%) |
|---|---|---|---|---|
| Example 20 | 7.0 | 2.5 | 2800 | 60 |
| Example 21 | 7.0 | 2.5 | 2000 | 55 |
| Example 22 | 6.0 | 2.2 | 2000 | 60 |
| Example 23 | 6.0 | 2.4 | 2500 | 80 |
| Example 24 | 8.0 | 2.3 | 2000 | 70 |

As is clear from Tables 5 to 6, the batteries in Examples 20 to 24 are excellent in capacity, cycle life, and large current discharge performance as compared to those in Comparative examples 1 to 5.

According to the active material of at least one of the embodiments and the examples, it is possible to provide an active material having a high capacity and excellent in large current discharge performance and cycle life performance in the case where the ratio ($\alpha/\beta$) of the mole number of Nb to the mole number of Ti in the monoclinic niobium titanium composite oxide particles satisfies the range of $0.5 \leq (\alpha/\beta) \leq 2$ and the ratio ($\gamma/\sigma$) of the number of hydrogen atoms to the number of carbon atoms in the carbon material layer satisfies the range of $0 \leq (\gamma/\sigma) \leq 0.1$.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material, comprising:
monoclinic niobium titanium composite oxide particles which satisfy formula (1) and are capable of absorbing and releasing Li ions or Na ions; and
a carbon material layer which covers at least a part of surfaces of the niobium titanium composite oxide particles and satisfies formula (2):

$$0.5 \leq (\alpha/\beta) \leq 2 \quad (1)$$

$$0 \leq (\gamma/\sigma) \leq 0.1 \quad (2)$$

wherein
in the formula (1), α represents a mole number of Nb of the niobium titanium composite oxide particles and β represents a mole number of Ti of the niobium titanium composite oxide particles,
in the formula (2), γ represents a number of hydrogen atoms in the carbon material layer and σ represents a number of carbon atoms in the carbon material layer,
an average primary particle diameter of the monoclinic niobium titanium composite oxide particles covered with the carbon material layer ranges from 0.1 to 1 μm, and
the niobium titanium composite oxide particles comprise a monoclinic niobium titanium composite oxide represented by A$_x$TiM$_y$Nb$_{2-y}$O$_{7 \pm z}$, wherein $0 \leq x \leq 5$, $0 \leq y \leq 0.5$, $-0.3 \leq z \leq 0.3$, M represents at least one kind of metal other than Ti and Nb, and A represents Li or Na.

2. The active material according to claim 1, wherein the M is at least one metal selected from the group consisting of Mg, Al, V, Fe, Mo, Sn, and W.

3. The active material according to claim 1, wherein:

$$0.8 \leq (\alpha/\beta) \leq 1.9$$

$$0 \leq (\gamma/\sigma) \leq 0.05.$$

4. The active material according to claim 1, wherein an amount of the carbon material layer is from 0.1 to 5% by weight.

5. A nonaqueous electrolyte battery, comprising:
a positive electrode;
a negative electrode comprising the active material according to claim 1; and
a nonaqueous electrolyte.

6. The battery according to claim 5, wherein the positive electrode comprises at least one selected from the group consisting of lithium iron phosphate having an olivine crystal structure, lithium manganese phosphate, lithium manganese iron phosphate, fluorinated lithium iron sulfate, lithium nickel cobalt manganese oxide, and lithium manganese oxide having a spinel crystal structure.

7. The battery according to claim 5, wherein the positive electrode comprises at least one member selected from the group consisting of $LiFePO_4$, $LiMnPO_4$, $LiMn_{1-x}Fe_xPO_4$ where $0<x\leq 0.5$, $LiFeSO_4F$, $LiNi_aCo_bMn_{1-a-b}O_2$ where $0<a<1$, $0<b<1$, and $0<(1-a-b)<1$, $LiMn_2O_4$, and $LiMn_{1.5}Ni_{0.5}O_4$.

8. A battery pack, comprising:
the nonaqueous electrolyte battery according to claim 5.

9. A vehicle, comprising:
the battery pack according to claim 8.

10. The active material according to claim 1, wherein $0<(\gamma/\sigma)\leq 0.1$.

11. The active material according to claim 1, wherein $0.01\leq(\gamma/\sigma)\leq 0.1$.

12. The active material according to claim 1, wherein $0.8\leq(\alpha/\beta)\leq 1.875$.

13. The active material according to claim 1, wherein the monoclinic niobium titanium composite oxide particles covered with the carbon material layer have an average primary particle diameter of from 0.1 to 0.3 μm.

14. The active material according to claim 1, wherein the monoclinic niobium titanium composite oxide particles covered with the carbon material layer have an average secondary particle diameter of from 1 to 3 μm.

15. The active material according to claim 1, wherein the monoclinic niobium titanium composite oxide particles covered with the carbon material layer have an average secondary particle diameter of from 1 to 20 μm.

\* \* \* \* \*